United States Patent
Hollar, Jr. et al.

(10) Patent No.: US 9,617,382 B2
(45) Date of Patent: *Apr. 11, 2017

(54) PROCESS FOR THE PURIFICATION OF POLYCARBONATE

(71) Applicant: SABIC Global Technologies B.V., Bergen op Zoom (NL)

(72) Inventors: William E. Hollar, Jr., Mount Vernon, IN (US); Pankaj Singh Gautam, Evansville, IN (US); Mohan Khadilkar, Mount Vernon, IN (US); Zeljko Kuzeljevic, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/907,354

(22) PCT Filed: Jul. 25, 2014

(86) PCT No.: PCT/US2014/048235
§ 371 (c)(1),
(2) Date: Jan. 25, 2016

(87) PCT Pub. No.: WO2015/013639
PCT Pub. Date: Jan. 29, 2015

(65) Prior Publication Data
US 2016/0168323 A1 Jun. 16, 2016

Related U.S. Application Data

(60) Provisional application No. 61/858,260, filed on Jul. 25, 2013.

(51) Int. Cl.
C08G 64/00 (2006.01)
C08G 64/40 (2006.01)
(52) U.S. Cl.
CPC .................. C08G 64/406 (2013.01)
(58) Field of Classification Search
CPC .................................................. C08G 64/406
USPC ........................................ 528/196, 198, 502
See application file for complete search history.

(56) References Cited

U.S. PATENT DOCUMENTS

| | | | |
|---|---|---|---|
| 3,666,719 A | 5/1972 | Morgenstern et al. | |
| 4,154,775 A | 5/1979 | Axelrod | |
| 4,191,685 A | 3/1980 | Haaf et al. | |
| 4,316,009 A | 2/1982 | Rinaldi et al. | |
| 4,692,490 A | 9/1987 | Abolins | |
| 6,420,517 B1 | 7/2002 | Van Gool et al. | |
| 6,458,920 B1 | 10/2002 | Baxendell et al. | |
| 7,517,944 B2 | 4/2009 | Kunishi et al. | |
| 2016/0168322 A1* | 6/2016 | Gautam | C08G 64/24 528/201 |
| 2016/0177029 A1 | 6/2016 | Hollar, Jr. et al. | |

FOREIGN PATENT DOCUMENTS

| | | |
|---|---|---|
| CN | 102604067 A | 7/2012 |
| CN | 102775595 A | 11/2012 |
| EP | 1020483 A2 | 7/2000 |
| GB | 2043083 A | 10/1980 |
| WO | 0224784 A1 | 3/2002 |

OTHER PUBLICATIONS

International Search Report for international Application No. PCT/US2014048235, International filing date Jul. 25, 2014, Date of mailing Nov. 28, 2014, 4 pages.
Written Opinion for International Application No. PCT/US2014048235, International filing date Jul. 25, 2014, Date of mailing Nov. 28, 2014, 5 pages.
Cheng et al.; "Improvement of washing and separation process for polycarbonate"; Cheng Reference_MT_ENG; vol. 33, No. 2; 2013; 7 pages.

* cited by examiner

*Primary Examiner* — Terressa Boykin
(74) *Attorney, Agent, or Firm* — Cantor Colburn LLP

(57) ABSTRACT

In an embodiment, a process of purifying a polycarbonate from an interfacial polymerization product mixture comprising an aqueous phase and an organic phase comprising a first organic solvent, the polycarbonate, a catalyst, and ions, the process comprises: separating the aqueous phase and the organic phase to form a separated aqueous feed stream and a separated organic stream; extracting the catalyst and the ions from the separated organic stream to form a purified polycarbonate stream and an extracted aqueous feed stream, wherein at least one of the separated aqueous feed stream and the extracted aqueous feed stream comprise an organic portion and an aqueous portion; purifying an aqueous stream comprising one or both of the separated aqueous feed stream and the extracted aqueous feed stream by adjusting a viscosity of the organic portion to be less than or equal to 40 centipoise by adding a second organic solvent to the aqueous stream to form a combined stream; optionally, adjusting a ratio of the aqueous portion to the organic portion to 1.0 to 20.0 by adding an aqueous solution to the aqueous stream; and separating the combined stream to form a purified aqueous stream, wherein less than or equal to 3 vol % of the purified aqueous stream is the organic portion.

18 Claims, 3 Drawing Sheets

PROCESS FOR THE PURIFICATION OF POLYCARBONATE

CROSS REFERENCE TO RELATED APPLICATIONS

This application is a National Stage application of PCT/US2014/048235, filed Jul. 25, 2014, which claims the benefit of U.S. Provisional Application No. 61/858,260, filed Jul. 25, 2013; which are incorporated by reference in their entirety herein.

BACKGROUND

Interfacial processes for the polymerization of polycarbonate yield a mixture comprising an aqueous phase and an organic phase. The aqueous phase, also referred to as the brine phase, comprises salts, ionic species, and interfacial catalyst. The organic phase, also referred to as the polymer phase, comprises solvent, dissolved polycarbonate, and interfacial catalyst. Some salts or ionic species (hereinafter "ions" for convenience) can further be present in the organic phase as a result of brine entrainment from the aqueous phase. These ions, as well as any interfacial catalyst, are generally removed from the organic phase in a purification process as they affect the final product quality. The purification process generally involves separation of the aqueous phase from the organic phase followed by the removal of ions and catalyst in one or more extraction steps to result in a purified polycarbonate.

A problem in polycarbonate purification processes is that the organic phase and the aqueous phase can form an emulsion, especially in the manufacture of copolycarbonates and polycarbonate-esters. Emulsification is characterized by creation of small, difficult-to-remove droplets of a first phase dispersed within a second phase. Accordingly, emulsification can result in one or both of only a partial separation of the organic and the aqueous phase, such that part of the organic phase is carried over and flows out with the aqueous phase; and an insufficient removal of impurities (such as ions and catalyst) from the organic phase. As a result, stable plant operation can be difficult to maintain and ultimately the quantity and the quality of the purified polycarbonate can be reduced.

A purification process that treats a removed aqueous phase comprising organic phase carryover to further separate out the polycarbonate carryover is desirable.

BRIEF DESCRIPTION

Disclosed herein is a method for the purification of polycarbonate.

In an embodiment, a process of purifying a polycarbonate from an interfacial polymerization product mixture comprising an aqueous phase and an organic phase comprising a first organic solvent, the polycarbonate, a catalyst, and ions, the process comprises: separating the aqueous phase and the organic phase to form a separated aqueous feed stream and a separated organic stream; extracting the catalyst and the ions from the separated organic stream to form a purified polycarbonate stream and an extracted aqueous feed stream, wherein at least one of the separated aqueous feed stream and the extracted aqueous feed stream comprise an organic portion and an aqueous portion; purifying an aqueous stream comprising one or both of the separated aqueous feed stream and the extracted aqueous feed stream by adjusting a viscosity of the organic portion to be less than or equal to 40 centipoise by adding a second organic solvent to the aqueous stream to form a combined stream; optionally, adjusting a ratio of the aqueous portion to the organic portion to 1.0 to 20.0 by adding an aqueous solution to the aqueous stream; and separating the combined stream to form a purified aqueous stream, wherein less than or equal to 3 vol % of the purified aqueous stream is the organic portion.

The above described and other features are exemplified by the following figures and detailed description.

BRIEF DESCRIPTION OF THE DRAWINGS

The following figures are exemplary embodiments, wherein the like elements are numbered alike.

DETAILED DESCRIPTION

Figure 1:
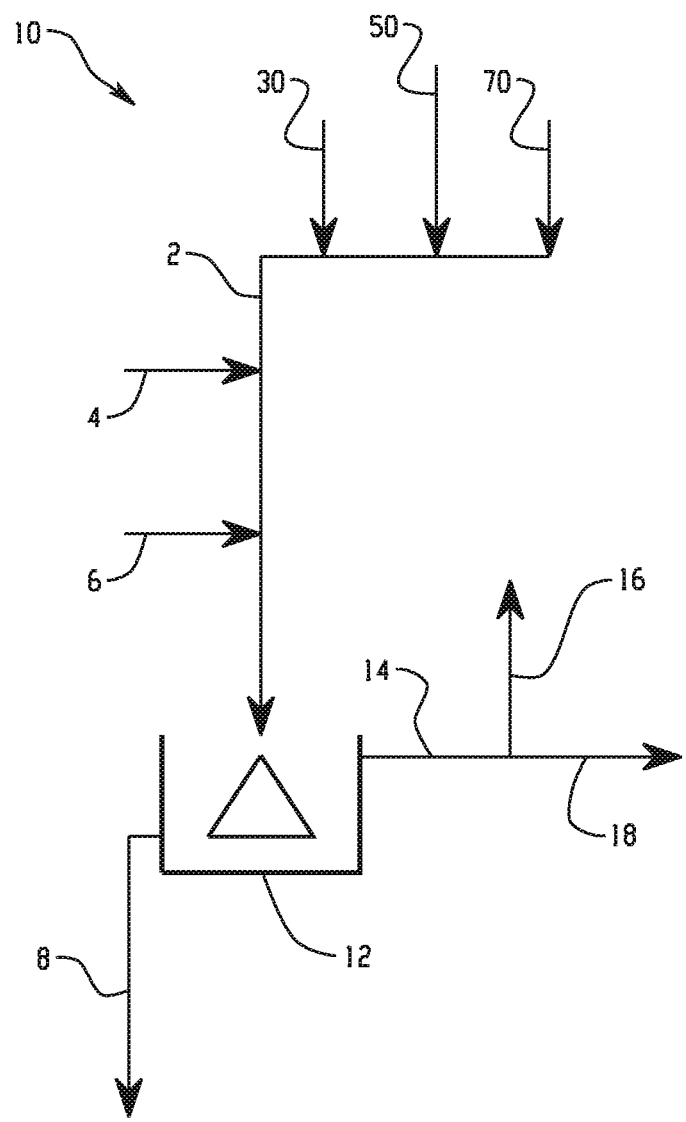
FIG. 1 is a schematic of a carryover purification unit.

Interfacial polymerization to form polycarbonate results in a product mixture comprising an organic phase (also referred to a polymer phase), which contains the polycarbonate, and an aqueous phase (also referred to as the brine phase), which contains ions and catalyst. Purification processes to purify the polycarbonate generally involve phase separation of the organic phase and the aqueous phase; catalyst extraction from the organic phase via an acid wash; and ion extraction step from the organic phase via a water wash. The separation and the ion extraction step can occur in the same step (e.g., simultaneously). Catalyst extraction and ion extraction can occur in the same step (e.g., simultaneously). One or more of these steps in the purification process, as well as various transfer and storage steps, can result in carryover of the organic phase with the separated aqueous phase, due to emulsification. Methods for the purification of aqueous streams containing organic phase carryover would improve the yield of polycarbonate manufacturing processes.

A process scheme to treat an aqueous phase comprising carryover has been developed. The process is useful for any aqueous stream comprising, for example, greater than 2 volume percent (vol %) of an organic phase based on the total volume of the aqueous stream. The process is especially useful for any aqueous stream comprising greater than or equal to 10 vol % of an organic phase based on the total volume of the aqueous stream. The process comprises, for example, breaking the emulsion and separating the resulting phases by adding an organic solvent and if needed, an aqueous solution (e.g., comprising water), to the aqueous stream to form a combined stream; and separating the combined stream in a separation unit (e.g., a centrifuge). In order to obtain the separation, the type and amount of organic solvent can be selected to decrease the viscosity of the organic phase, for example, to obtain a separated organic phase having a viscosity of less than or equal to 40 centipoise (cP). The pH of the aqueous solution (e.g., comprising water) can be selected to adjust the separated aqueous phase to a pH of 2 to 10. The aqueous solution (e.g., comprising water) is added in an amount effective to provide a ratio of the aqueous portion to organic portion in the combined stream of 1.0 to 20.0. It was surprisingly found that conducting the process at a lower polycarbonate concentration (as reflected by the viscosity of the organic portion) and optionally at a lower concentration of organic phase (as reflected by the ratio of aqueous to organic portions) can result in an improved emulsion break up and ultimately in improved separation. The improved emulsion breakup allows use of more intense mixing during separation, which can further improve separation. The carryover purification process can result in a purified aqueous stream with 3 vol % or less of the total organic portion. The carryover purification process can be useful for the purification of polycarbonates that tend to easily form emulsions, for example, copolycarbonates with bulky carbonate units as described in further detail below.

"Polycarbonate" as used herein means a homopolymer or copolymer having repeating structural carbonate units of formula (1)

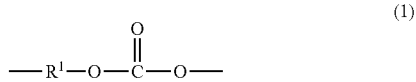

wherein at least 60 percent of the total $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

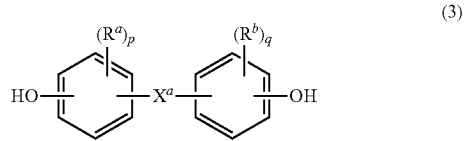

In formula (2), each $R^h$ is independently a halogen atom, for example, bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl; and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of specific dihydroxy compounds include the following: bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis (4-hydroxyphenyl) propane ("bisphenol A" or "BPA", in which each of $A^1$ and $A^2$ is p-phenylene and $Y^1$ is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane (DMBPC), and 1,1-bis(4-hydroxy-3-methylphenyl)-3,3,5-trimethylcyclohexane (isophorone bisphenol).

"Polycarbonate" as used herein also includes copolymers comprising carbonate units and other types of polymer units, such as ester units ("polyestercarbonates," also known as polyester-polycarbonates). Polyestercarbonates further contain, in addition to recurring carbonate chain units of formula (1), repeating ester units of formula (4)

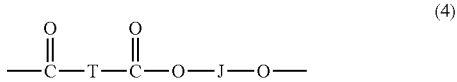

(4)

wherein J is a divalent group derived from a dihydroxy compound, and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid, and can be, for example, a $C_{2-10}$ alkylene, a $C_{6-20}$ cycloalkylene, or a $C_{6-20}$ arylene. Copolyesters containing a combination of different T and/or J groups can be used. The polyesters can be branched or linear.

Specific dihydroxy compounds include aromatic dihydroxy compounds of formula (2) (e.g., resorcinol), bisphenols of formula (3) (e.g., bisphenol A), an aliphatic diol such as ethane diol, n-propane diol, i-propane diol, 1,4-butane diol, 1,4-cyclohexane diol, 1,4-hydroxymethylcyclohexane, or a combination comprising at least one of the foregoing dihydroxy compounds. Aromatic dicarboxylic acids that can be used include terephthalic acid, isophthalic acid, naphthalene dicarboxylic acid, 1,4-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used. Specific ester units include ethylene terephthalate, n-propylene terephthalate, n-butylene terephthalate 1,4-cyclohexanedimethylene terephthalate, and ester units derived from isophthalic acid, terephthalic acid, and resorcinol (ITR).

The molar ratio of ester units to carbonate units in the copolymers can vary broadly, for example, 1:99 to 99:1, specifically, 10:90 to 90:10, more specifically, 25:75 to 75:25. Specific polyestercarbonates are those including bisphenol A carbonate units and isophthalate-terephthalate-bisphenol A ester units, also commonly referred to as poly(carbonate-ester)s (PCE) poly(phthalate-carbonate)s (PPC), depending on the molar ratio of carbonate units to ester units.

The polycarbonate can comprise a linear homopolymer containing bisphenol A carbonate units (BPA PC). However, the low shear processes described herein are especially useful for the purification of polyesters such as PPC and PEC, and copolycarbonates including bisphenol A and bulky bisphenol carbonate units, i.e., derived from bisphenols containing at least 12 carbon atoms, for example, 12 to 60 carbon atoms or 20 to 40 carbon atoms. Examples of such copolycarbonates include copolycarbonates comprising bisphenol A carbonate units and 2-phenyl-3,3'-bis(4-hydroxyphenyl) phthalimidine carbonate units (a BPA-PPPBP copolymer), a copolymer comprising bisphenol A carbonate units and 1,1-bis(4-hydroxy-3-methylphenyl)cyclohexane carbonate units (a BPA-DMBPC copolymer), and a copolymer comprising bisphenol A carbonate units and isophorone bisphenol carbonate units (available, for example, under the trade name APEC from Bayer).

The polycarbonate can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

The reaction conditions for interfacial polymerization to produce the polycarbonates can vary, but an exemplary process generally involves dissolving or dispersing the dihydroxy compound in aqueous NaOH or KOH, adding the resulting mixture to a water-immiscible solvent, and contacting the reactants with a carbonate precursor in the presence of a catalyst such as a tertiary amine or a phase transfer catalyst, under controlled pH conditions, e.g., 8 to 10. The water-immiscible solvent can be, for example, methylene chloride, ethylene dichloride, 1,2-dichloroethane, chlorobenzene, toluene, and the like.

The carbonate precursor can be a carbonyl halide, a bishaloformate of a dihydroxy compound, or a diaryl carbonate. The carbonyl halide can be carbonyl bromide or carbonyl chloride (phosgene). The bischloroformate can be the bischloroformate of bisphenol A, hydroquinone, ethylene glycol, neopentyl glycol, or the like. The diaryl carbonate can be a diaryl carbonate of formula (5)

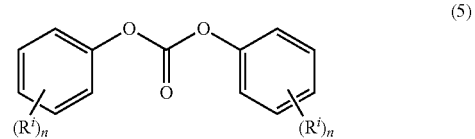

(5)

wherein n is an integer 1 to 3 and each R' is independently a linear or branched, optionally substituted $C_{1-34}$ alkyl (specifically $C_{1-6}$ alkyl, more specifically $C_{1-4}$ alkyl), $C_{1-34}$ alkoxy (specifically $C_{1-6}$ alkoxy, more specifically $C_{1-4}$ alkoxy), $C_{5-34}$ cycloalkyl, $C_{7-34}$ alkylaryl $C_{6-34}$ aryl, a halogen (specifically a chlorine), or —C(=O)OR' wherein R' is H, linear or branched $C_{1-34}$ alkyl (specifically $C_{1-6}$ alkyl, more specifically $C_{1-4}$ alkyl), $C_{1-34}$ alkoxy (specifically $C_{1-16}$ alkoxy, specifically $C_{1-4}$ alkoxy), $C_{5-34}$ cycloalkyl, $C_{7-34}$ alkylaryl, or $C_{6-34}$ aryl. In an embodiment, the diaryl carbonate is diphenyl carbonate, or a diaryl carbonate wherein one or both aryl groups have an electron-withdrawing substituents, for example, bis(4-nitrophenyl)carbonate, bis(2-chlorophenyl)carbonate, bis(4-chlorophenyl)carbonate, bis (methyl salicyl)carbonate, bis(4-methylcarboxylphenyl) carbonate, bis(2-acetylphenyl) carboxylate, bis(4-acetylphenyl) carboxylate. A molar ratio of diaryl carbonate to dihydroxy compound can be 2:1 to 1:2, or 1.5:1 to 1:1.5, or 1.05:1 to 1:1.05, or 1:1. In an embodiment, the molar ratio of the diaryl carbonate to the dihydroxy compound when expressed to three decimal places is 0.996 or less, or 0.962 to 0.996, or 0.968 to 0.996, or 0.971 to 0.994. Combinations comprising at least one of the above described types of carbonate precursors can be used.

Interfacial polymerization reaction to form carbonate linkages using phosgene as a carbonate precursor is advantageously used to manufacture the polycarbonates purified by the processes described herein. In the manufacture of polyester-polycarbonates by interfacial polymerization, rather than using the dicarboxylic acid or diol per se, the reactive derivatives of the acid or diol, such as the corresponding acid halides, in particular the acid dichlorides and the acid dibromides can be used. Thus, for example, instead of using isophthalic acid, terephthalic acid, or a combination comprising at least one of the foregoing acids, isophthaloyl dichloride, terephthaloyl dichloride, or a combination comprising at least one of the foregoing dichlorides can be used.

Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Examples of phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is $Cl^-$, $Br^-$, a $C_{1-8}$ alkoxy group or a $C_{6-18}$ aryloxy group. An effective amount of a phase transfer catalyst can be 0.1 to 10 weight percent (wt %), or 0.5 to 2 wt %, each based on the weight of bisphenol in the phosgenation mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt %. Combinations comprising linear polycarbonates and branched polycarbonates can be used.

An end-capping agent (also referred to as a chain stopper agent or chain terminating agent) can be included during polymerization to provide end groups. The end-capping agents (and thus end groups) are selected based on the desired properties of the polycarbonates. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryloyl chloride, and mono-chloroformates such as phenyl chloroformate, alkyl-substituted phenyl chloroformates, p-cumyl phenyl chloroformate, and toluene chloroformate. Combinations of different end groups can be used.

As described above, interfacial polymerization provides a mixture of an aqueous phase that comprises water, ions, and catalyst, and an organic phase that comprises organic solvent, polycarbonate, and, to a lesser degree than the aqueous phase, water, ionic species, and catalyst. The aqueous phase and the organic phase of the product mixture are first separated to provide a separated aqueous stream and a separated organic phase. Examples of separation units include coalescers with a decanter zone, decanters, and centrifuges, or a combination comprising one or more of the foregoing. Next, the organic phase is extracted to remove the ions and interfacial catalyst from the separated organic phase and can result in an extracted aqueous stream. The catalyst can be extracted from the separated organic stream before the extraction of the ions, or the catalyst and the ions can be extracted in a single extraction process. Examples of extraction units include extraction columns (such as those operated in counter current mode). As described above, any of the foregoing processes can result in an aqueous stream comprising carryover (also referred to as a separate organic phase, or more commonly, an emulsified phase comprising an organic portion) that can be used as the aqueous feed stream in the current process. Any transfer or storage (for example, agitated storage) that occurs in connection with the separation and extraction can also result in an emulsion-containing an aqueous feed stream, as well as any unit flushing or cleaning steps. Any one or more aqueous feed streams can be combined to provide a single aqueous feed stream. Alternatively, any plurality of aqueous feed streams can be separated and treated individually.

The process is useful for any aqueous feed streams comprising any amount of carryover. However, the process is useful for aqueous streams with an aqueous portion and greater than 2 vol % of an organic portion, or greater than or equal to 3 vol %, or greater than or equal to 5.5 vol %, or greater than or equal to 7 vol % of an organic portion, each based on the total volume of the organic portion and the aqueous portion. The process is useful for any aqueous stream comprising greater than or equal to 10 vol % of an organic portion in the aqueous portion. The maximum amount of organic portion is not particularly limited, as the amount of aqueous portion and organic portion are adjusted as described below. In general, however, the aqueous stream can comprise up to 50 vol %, or up to 80 vol % of the organic portion, each based on the total volume of the organic portion and the aqueous portion.

To aid in breaking the emulsion, an organic solvent can be added to the aqueous feed stream. The type and amount of organic solvent can be selected to decrease the viscosity of the organic portion, and in particular to obtain a separated organic portion having a viscosity of less than or equal to 40 centipoise (cP), less than or equal to 30 cP, specifically, 20 to 30 cP. The organic solvent is compatible with (e.g., forms a single phase with) the organic portion in the emulsion, and can be the same solvent as the organic portion of the aqueous feed stream, e.g., dichloromethane, dichloroethane, or a combination comprising one or more of the foregoing. The amount of organic solvent needed to adjust the viscosity of the separated organic portion can be determined by separating a test sample of the aqueous feed, and determining the amount of organic solvent required to adjust the viscosity to the desired level. Viscosity can be determined, for example, by ASTM D5225-09 or by ISO 1628-5. Without being bound by theory, it is believed that reducing the viscosity of the organic portion facilitates breaking the emulsion. The combined amount of organic portion originally present in the aqueous feed stream and the amount of organic solvent added to the aqueous feed stream is referred to herein as the "total organic portion" of the aqueous feed stream.

A water stream can also be added to the aqueous feed stream. The water stream can be added in an amount effective to provide a ratio of the aqueous portion to total organic portion in the combined stream of 1.0 to 20.0, specifically, 1.1 to 18.0, more specifically 1.2 to 15.0, and more specifically 1.3 to 13.0. The ratio of aqueous portion to total organic portion can be 1.0 to 10.0, specifically, 1.1 to 8.0, more specifically, 1.2 to 6.0, and more specifically, 1.0 to 4.0. The pH of the water stream can be adjusted in order to provide a separated aqueous stream having a pH of 1.0 to 10.0, specifically, 1.5 to 8.0, more specifically, 2.0 to 6.0.

The organic solvent and the water can be added to the aqueous feed stream separately, at the same time, or premixed. The organic solvent can be added to the aqueous feed stream, optionally followed by adding the water, to provide a combined stream. The combined stream is introduced to a separation unit (e.g., a centrifuge), and separated to provide a purified aqueous stream and a polycarbonate stream.

Conducting the process at a lower polycarbonate concentration (as reflected by the viscosity of the organic portion) and optionally at a lower concentration of organic portion (as reflected by the ratio of aqueous to organic portion) can result in an improved emulsion breakup and ultimately in improved separation. The improved emulsion breakup allows use of more intense mixing during separation, which can further improve separation. For example, the separation process can occur at a high shear rate, for example, at a high shear rate of greater than or equal to 150,000 reciprocal seconds ($S^{-1}$), where shear rate as used herein is the ratio of velocity and characteristic dimension of a passage through which a fluid is flowing (for example, if a fluid is rotating at the speed of 1 m/s and the fluid is forced to circuit through 1 mm gap between mixer and vessel wall, then the shear rate is 1/0.001 equal to 1,000 $S^{-1}$). The carryover purification process can result in a purified aqueous stream with 3 vol % or less, 2 vol % or less, 1 vol % or less, or 0.5 vol % or less of the total organic portion, each based on the total volume of the organic portion and the aqueous portion.

FIG. 1 is a schematic diagram illustrating a carryover purification system 10, where three carryover streams: 30, 50, and 70 can be combined to be aqueous feed stream 2. The carryover streams: 30, 50, and 70 can arise from a phase separation step, a catalyst extraction step, and an ion extraction step, respectively. It is understood that while FIG. 1 illustrates that three carryover streams: 30, 50, and 70 can be combined for purification, it is also possible that one or more of the streams may be absent, for example, if one or more of the streams has little to no carryover, specifically, if the stream comprises less than or equal to 3 vol %, more specifically, less than or equal to 2 vol % organic portion carryover. One or more of the streams may have little to no carryover if, for example, a low shear purification unit was employed, for example, with a shear rate of less than 150,000 $S^{-1}$. Likewise, if the catalyst extraction and the ion extraction were performed as a combined extraction step, then carryover streams 50 and 70 can be introduced to the carryover purification process as a single carryover stream.

FIG. 1 further illustrates that organic solvent stream 4 and water stream 6 can be added to the aqueous feed stream 2 to form a combined stream, and the combined stream can be introduced to a separation device such as the centrifuge 12. The organic solvent stream 4 can be added to the combined stream before, after, or as a mixed stream with the water stream 6. The addition of the water stream 6 results in an increase in the ratio of the aqueous portion to organic portion in the mixture as described above. It is understood that if the ratio of the aqueous portion to the organic portion is within 1.0 to 20.0 before the addition of water stream 6, that water stream 6 does not need to be added. The mixing and separation in the centrifuge can be performed at high shear conditions, e.g., at a shear rate of 150,000 $S^{-1}$ or greater. A purified aqueous stream 8 and a polycarbonate stream 14 can exit the centrifuge 12. All or part of polycarbonate stream 14 can be recycled via recycling stream 16, where recycling stream 16 can be recycled back to upstream operations. All or part of polycarbonate stream 14 can be further purified via purification stream 18, where additional purification can comprise introducing purification stream 18 to one or more separation units or extraction units for further separation of the aqueous phase, or extraction of catalyst and/or ions.

Figure 2:
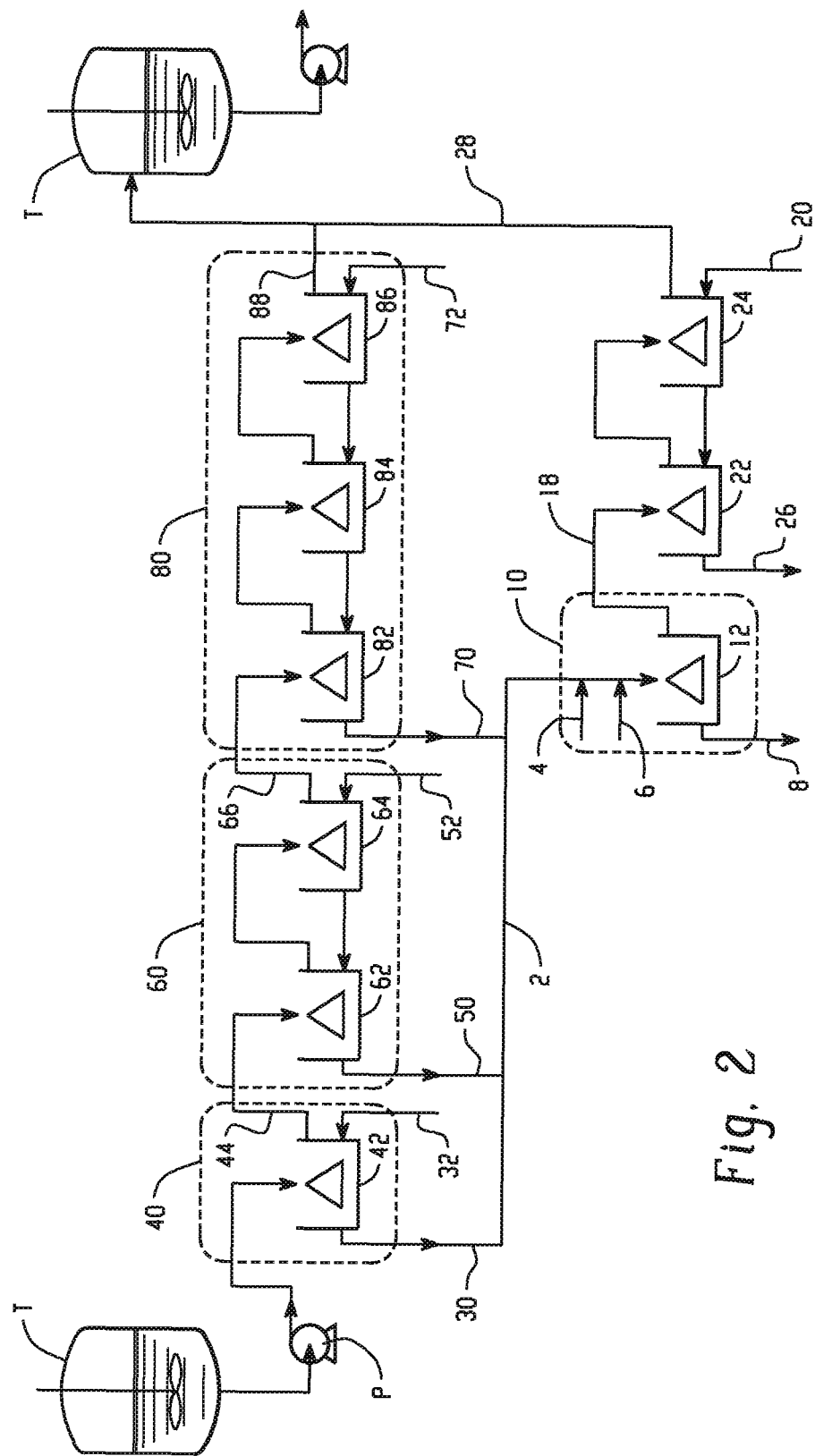
FIG. 2 is a schematic of a purification process utilizing a carryover purification process.

FIG. 2 illustrates an apparatus for the polycarbonate purification process with a series of countercurrent centrifuges. Specifically, an interfacial polymerization reaction product mixture can be pumped via pump P from tank T into a phase separation unit 40 (enclosed by dashed lines) comprising centrifuge 42 that separates the organic phase from the aqueous phase. An optional aqueous cleaning stream 32 can be introduced to the centrifuge 42. An aqueous feed stream containing carryover stream 30 can be directed to the carryover purification unit 10 (enclosed by dashed lines). The separated organic stream 44 can then be directed to catalyst separation unit 60 (enclosed by dashed lines) that can comprise two counter current centrifuges 62 and 64. A low pH stream 52 can be introduced to the catalyst separation unit 60, for example, in centrifuge 64. The low pH stream 52 can have a pH of less than or equal to 3, specifically, less than or equal to 2, more specifically, 0.5 to 2, even more specifically, 1 to 1.5. An aqueous, catalyst-rich feed stream containing carryover stream 50 can be directed to the carryover purification unit 10. Separated, reduced catalyst organic stream 66 can be directed to an ion extraction unit 80 (enclosed by dashed lines) that can comprise three counter current centrifuges 82, 84, and 86. An aqueous wash stream 72 can be introduced into the catalyst separation unit 80, for example, in centrifuge 86. An aqueous, ion-rich feed stream containing carryover stream 70 can be directed to the carryover purification unit 10.

The carryover streams 30, 50, and 70 can be combined to provide aqueous feed stream 2 before treatment in carryover purification unit 10, to be processed as described in FIG. 1 to produce the exiting polycarbonate stream 18. The exiting polycarbonate stream 18 can be further purified, for example, with additional water washes. FIG. 2 illustrates that polycarbonate stream 18 can be introduced to a series of counter current centrifuges 22 and 24. Cleaning stream 20, which can be a water stream, can be introduced into centrifuge 24 and can exit centrifuge 22 as an impurity-rich stream 26. A further purified polycarbonate stream 28 can exit centrifuge 24 and can be optionally combined with purified polycarbonate stream 88 exiting the ion extraction unit 80. The purified polycarbonate can be directed to a storage tank T.

Figure 3:
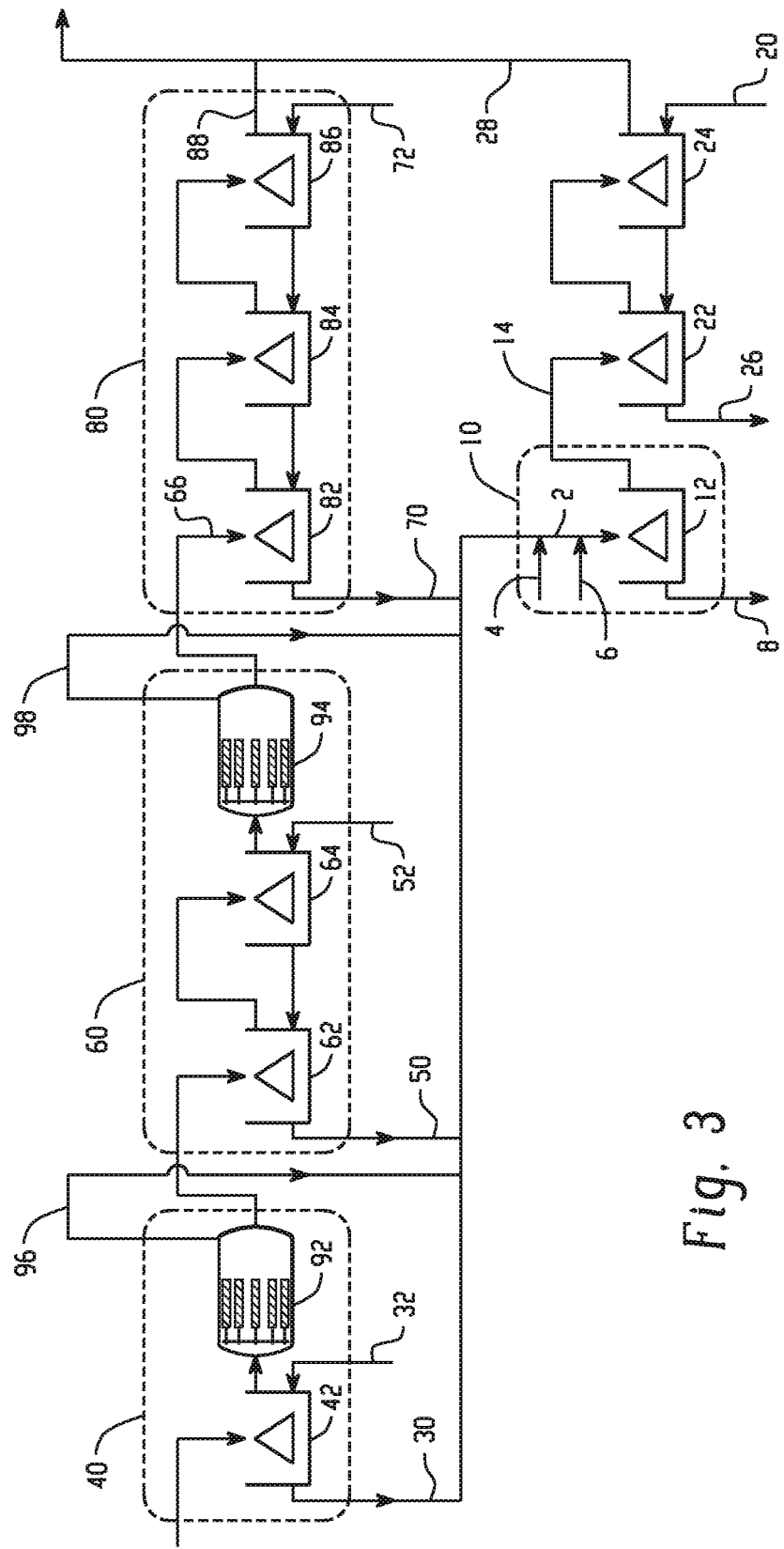
FIG. 3 is a schematic of a purification process utilizing a carryover purification process.

FIG. 3 illustrates a similar purification process as that of FIG. 2 except that two separating coalescers 92 and 94 are present, one after the centrifuge 42 in the phase separation unit 40 and one after the centrifuge 64 in the catalyst separation unit 60. The separating coalescers 92 and 94 can increase the size of the aqueous phase droplets and can facilitate separation in downstream centrifuges. Separating coalescers 92 and 94 can comprise a coalescing media and a phase separation (decanting) zone, where separated aqueous phase from the coalescers can be removed from the coalescers as aqueous feed streams containing carryover stream 96 and 98, respectively. The carryover streams 96 and 98 can be directed to the carryover purification unit 10 and added to the combined aqueous feed stream 2.

It is to be understood that while FIGS. 2 and 3 are directed to separation processes utilizing centrifuges and separating coalescers, various other separation units such as decanters and extraction columns can likewise be used.

Use of the foregoing carryover purification processes results in improved separation of the aqueous feed streams and improved yield of the polycarbonate product. For example, the amount of organic portion remaining in a purified aqueous stream can be less than or equal to 10 vol %, specifically 0 to 10 vol %, more specifically, 0 to 7 vol %, more specifically, 0 to 5.5 vol %, and even more specifically, 0 to 2 vol %. The amount of aqueous portion remaining in the purified polycarbonate stream can be less than or equal to 10 vol %, specifically 0 to 10 vol %, more specifically, 0 to 7 vol %, more specifically, 0 to 5.5 vol %, and even more specifically, 0 to 2 vol %. Specifically, a non-detectable amount as determined by Karl-Fischer analysis (e.g., ASTM E203-08) of an aqueous portion carryover is present in the resultant polycarbonate stream. Improved separation of both the aqueous feed streams and the polycarbonate product streams can be obtained.

Because the emulsification properties of different polycarbonate product mixtures can vary, the emulsification properties of a polycarbonate product mixture or any aqueous stream can be determined by methods known in the art before implementing any part of the carryover purification process. Once a stream is identified as being likely to emulsify, the carryover purification process can be employed. Otherwise, standard processes can be employed.

Polycarbonates manufactured and purified as described herein are suitable for use in a wide variety of compositions and applications as is known in the art. Thus, an additive composition can be added to the purified polycarbonate to form a polycarbonate composition. The additive composition can have one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive can be soluble and/or non-soluble in polycarbonate.

The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, and anti-drip agent (e.g., a PTFE-encapsulated styrene-acrylonitrile copolymer (TSAN)), or a combination comprising one or more of the foregoing. For example, a combination of a heat stabilizer, mold release agent and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

Heat stabilizer additives include organophosphites (e.g., triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate or the like), or combinations comprising at least one of the foregoing heat stabilizers. The heat stabilizer can be tris(2,4-di-t-butylphenyl) phosphate available as IRGAPHOS™ 168. Heat stabilizers are generally used in amounts of 0.01 to 5 wt %, based on the total weight of polymer in the composition.

There is considerable overlap among plasticizers, lubricants, and mold release agents, which include, for example, glycerol tristearate (GTS), phthalic acid esters (e.g., octyl-4,5-epoxy-hexahydrophthalate), tris-(octoxycarbonylethyl) isocyanurate, tristearin, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g., alkyl stearyl esters, such as, methyl stearate, stearyl stearate, and the like), waxes (e.g., beeswax, montan wax, paraffin wax, or the like), or combinations comprising at least one of the foregoing plasticizers, lubricants, and mold release agents. These are generally used in amounts of 0.01 to 1 wt %, based on the total weight of the polymer in the composition.

Light stabilizers, in particular ultraviolet light (UV) absorbing additives, also referred to as UV stabilizers, include hydroxybenzophenones (e.g., 2-hydroxy-4-n-octoxy benzophenone, commercially available under the trade name CYASORB 531 from Cytec), hydroxybenzotriazines (e.g., 2-[4,6-bis(2,4-dimethylphenyl)-1,3,5-triazin-2-yl]-5-(octyloxy)-phenol, commercially available under the trade name CYASORB 1164 from Cytec), cyanoacrylates (e.g., 1,3-bis [(2-cyano-3,3-diphenylacryloyl)oxy]-2,2-bis[[(2-cyano-3,3-diphenylacryloyl)oxy]methyl]propane, commercially available under the trade name UVINUL 3030), oxanilides, benzoxazinones (e.g., 2,2'-(1,4-phenylene)bis(4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)phenol, commercially available under the trade name CYASORB 5411 from Cytec), inorganic materials such as titanium oxide, cerium oxide, and zinc oxide, all with particle size less than or equal to 100 nanometers, or combinations comprising at least one of the foregoing light stabilizers. The UV stabilizers can be present in an amount of 0.01 to 1 wt %, specifically, 0.1 to 0.5 wt %, and more specifically, 0.15 to 0.4 wt %, based upon the total weight of polymer in the composition.

The polycarbonate compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Shaped, formed, or molded articles comprising the polycarbonate compositions are also provided. The polycarbonate compositions can be formed into useful shaped articles by a variety of methods such as extrusion, calendaring, molding (e.g., injection molding, rotational molding, blow molding, compression molding), thermoforming, and combinations comprising at least one of these methods. Some examples of articles include computer and business machine housings such as housings for monitors, handheld electronic device housings such as housings for cell phones, electrical connectors, and components of lighting fixtures (e.g., luminaires, headlights, and so forth), ornaments, home appliances, roofs, greenhouses, sun rooms, swimming pool enclosures, medical devices, containers (e.g., food containers), and the like.

Set forth below are some embodiments of the process of manufacturing and purifying a polycarbonate.

In an embodiment, a process of purifying a polycarbonate from an interfacial polymerization product mixture comprising an aqueous phase and an organic phase comprising an organic solvent, a polycarbonate, catalyst, and ions, comprises at least one of: separating the aqueous phase and the organic phase; extracting the catalyst from the separated organic phase; extracting ions from the separated organic phase; to provide an aqueous feed stream comprising carryover, wherein the aqueous feed stream comprises an organic portion and an aqueous portion; adding an organic solvent to the aqueous feed stream in an amount effective for a viscosity of the total organic portion of the aqueous feed stream to be less than or equal to 40 centipoise, or less than or equal to 30 centipoise, or 20 to 30 centipoise; optionally, adding water to the aqueous feed stream in an amount effective for a ratio of the aqueous portion to the organic portion to be 1.0 to 20.0, or 1.0 to 15.0, or 1.0 to 10.0, or 1.0 to 6.0, to provide a combined stream; and separating the combined stream into a purified aqueous stream comprising less than or equal to 3 vol % of the total organic portion and a purified polycarbonate stream.

In specific embodiments, one or more of the following conditions can apply: pH of the water is effective for the pH of the aqueous portion of the combined stream to be 1.0 to 10.0 or 1.0 to 6.0; the purified aqueous stream comprises less than or equal to 2 vol % total organic portion or less than or equal to 1 vol % carry over; the process further comprises further purifying the purified polycarbonate stream; the extracting the catalyst occurs prior to the extracting the ions; the separating aqueous phase and the organic phase and the separating the combined stream occurs via a high shear rate centrifuge; the extracting of one or both of the catalyst and the ion occurs via an extraction column; the solvent in the organic portion and the organic solvent is methylene chloride or ethylene chloride; the polycarbonate is a bisphenol A homopolymer, a copolycarbonate comprising bisphenol A carbonate units and bulky bisphenol carbonate units derived from a bisphenol having at least 12 carbon atoms, or a polyestercarbonate comprising bisphenol A carbonate units and terephthalate-isophthalate acid-bisphenol A ester units; or the polycarbonate is a copolymer comprising bisphenol A carbonate units and 2-phenyl-3,3'-bis(4-hydroxyphenyl) phthalimidine carbonate units, a copolymer comprising bisphenol A carbonate units and 1,1-bis(4-hydroxy-3-methylphenyl)cyclohexane carbonate units, or a copolymer comprising bisphenol A carbonate units and isophorone bisphenol carbonate units.

The following examples are provided to illustrate the method of low shear purification of an interfacial reaction product comprising an aqueous portion and an organic portion. The examples are merely illustrative and are not intended to limit devices made in accordance with the disclosure to the materials, conditions, or process parameters set forth therein.

EXAMPLES

For all of Examples 1-4, the following procedure was followed, where the corresponding values and the resulting polycarbonate purification values are show in Table 1. First, a solution of a BPA-PPPBP copolycarbonate (made by interfacial polymerization, and sourced from SABIC's Innovative Plastics business) in methylene chloride was prepared, where the copolycarbonate concentration in solvent was varied from 7.9 to 14.1 wt %, and had a viscosity of less than 40 cP. An emulsion was created from each polycarbonate solution by the addition of an aqueous solution comprising water and sodium chloride (having a specific gravity of 1.1), with sufficient hydrochloric acid added to the aqueous solution to provide a pH of 2 to 10. After mixing, the resulting emulsions were combined with water to adjust the ratio of the aqueous portion to the organic portion. Specifically, the volumetric percent of aqueous portion in the total inlet stream varied from 57 to 92 vol %, which corresponds to a ratio of aqueous portion to organic portion of 1.3 to 11.5. The resulting stream was added via a centrifugal pump to a centrifuge (Westfalia TA-40 model with a maximal throughput of 35 gallons per minute (gal/min) (132.5 liters per minute (L/min)) and a 15 horsepower (11.2 kilowatt) motor).

TABLE 1

| Example | 1 | 2 | 3 | 4 |
|---|---|---|---|---|
| Polycarbonate concentration in the organic portion (wt %) | 11.3 | 14.1 | 7.9 | 9.0 |
| Aqueous portion pH | 9 | 9 | 2 | 10 |
| Total flow rate into the centrifuge (gal/min) | 10.2 | 8.9 | 12.0 | 15.6 |
| Total flow rate into the centrifuge (L/min) | 38.6 | 33.7 | 45.4 | 59.1 |
| Aqueous content at the inlet (vol %) | 83 | 92 | 57 | 70 |
| Ratio of aqueous portion to organic portion | 4.9 | 11.5 | 1.3 | 2.3 |
| Polycarbonate solution content at the inlet (vol %) | 17 | 8 | 43 | 30 |
| Polycarbonate solution content in aqueous portion at the outlet (vol %) | <2 | <2 | 0 | <1 |

Table 1 shows that the volumetric percent of organic portion has been reduced to less than 2 vol %, to as little as 0 vol % (Example 3) from inlet values of 8 to 43 vol %.

Set forth below are some embodiments of the present process for the purification of polycarbonate.

Embodiment 1: a process of purifying a polycarbonate from an interfacial polymerization product mixture comprising an aqueous phase and an organic phase comprising a first organic solvent, the polycarbonate, a catalyst, and ions, the process comprising: separating the aqueous phase and the organic phase to form a separated aqueous feed stream and a separated organic stream; extracting the catalyst and the ions from the separated organic stream to form a purified polycarbonate stream and an extracted aqueous feed stream, wherein at least one of the separated aqueous feed stream and the extracted aqueous feed stream comprise an organic portion and an aqueous portion; purifying an aqueous stream comprising one or both of the separated aqueous feed stream and the extracted aqueous feed stream by adjusting a viscosity of the organic portion to be less than or equal to 40 centipoise by adding a second organic solvent to the aqueous stream to form a combined stream; optionally, adjusting a ratio of the aqueous portion to the organic portion to 1.0 to 20.0 by adding an aqueous solution to the aqueous stream; and separating the combined stream to form a purified aqueous stream, wherein less than or equal to 3 vol % of the purified aqueous stream is the organic portion.

Embodiment 2: the process of Embodiment 1, wherein the organic portion of the aqueous stream has a viscosity of less than or equal to 30 centipoise.

Embodiment 3: the process of Embodiment 2, wherein the organic portion of the aqueous stream has a viscosity of 20 to 30 centipoise.

Embodiment 4: the process of any of Embodiments 1 to 3, comprising adjusting a ratio of the aqueous portion to the organic portion to 1.0 to 15.0 by adding the aqueous solution.

Embodiment 5: the process of Embodiment 4, wherein the ratio of the aqueous portion to the organic portion is 1.0 to 10.0.

Embodiment 6: the process of Embodiment 4, wherein the ratio of the aqueous portion to the organic portion is 1.0 to 6.0.

Embodiment 7: the process of any of Embodiments 1 to 6, further comprising adjusting a pH of the aqueous portion 1.0 to 10.0 by adding an aqueous solvent.

Embodiment 8: the process of Embodiment 7, wherein the pH is 1.0 to 6.0.

Embodiment 9: the process of any of Embodiments 1 to 8, wherein less than or equal to 2 vol % of the purified aqueous stream is the organic portion.

Embodiment 10: the process of Embodiment 9, wherein less than or equal to 1 vol % of the purified aqueous stream is the organic portion.

Embodiment 11: the process of any of Embodiments 1 to 10, wherein one or both of the first organic solvent and the second organic solvent comprises methylene chloride, ethylene chloride, or a combination comprising one or both of the foregoing.

Embodiment 12: the process of any of Embodiments 1 to 11, wherein the extracting the catalyst occurs prior to or during the extracting of the ions.

Embodiment 13: the process of any of Embodiments 1 to 12, wherein the separating aqueous phase and the organic phase and the separating the combined stream occurs via a high shear rate centrifuge.

Embodiment 14: the process of any of Embodiments 1 to 13, wherein the extracting of one or both of the catalyst and the ion occurs via one or more extraction columns.

Embodiment 15: the process of any of Embodiments 1 to 14, wherein the polycarbonate comprises a bisphenol A homopolymer, a copolycarbonate comprising bisphenol A carbonate units and bulky bisphenol carbonate units derived from a bisphenol having at least 12 carbon atoms, or a polyestercarbonate comprising bisphenol A carbonate units and terephthalate-isophthalate acid-bisphenol A ester units.

Embodiment 16: the process of Embodiment 15, wherein the polycarbonate comprises a copolymer comprising bisphenol A carbonate units and 2-phenyl-3,3'-bis(4-hydroxyphenyl) phthalimidine carbonate units, a copolymer comprising bisphenol A carbonate units and 1,1-bis(4-hydroxy-3-methylphenyl)cyclohexane carbonate units, or a copolymer comprising bisphenol A carbonate units and isophorone bisphenol carbonate units.

Embodiment 17: the process of any of Embodiments 1 to 16, further comprising further purifying the purified polycarbonate stream.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly dictated otherwise by context. Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A process of purifying a polycarbonate from an interfacial polymerization product mixture comprising an aqueous phase and an organic phase comprising a first organic solvent, the polycarbonate, a catalyst, and ions, the process comprising:
    separating the aqueous phase and the organic phase to form a separated aqueous feed stream and a separated organic stream;
    extracting the catalyst and the ions from the separated organic stream to form a purified polycarbonate stream and an extracted aqueous feed stream, wherein at least one of the separated aqueous feed stream and the extracted aqueous feed stream comprise an organic portion and an aqueous portion;
    purifying an aqueous stream comprising one or both of the separated aqueous feed stream and the extracted aqueous feed stream by
        adjusting a viscosity of the organic portion to be less than or equal to 40 centipoise by adding a second organic solvent to the aqueous stream to form a combined stream;
        optionally, adjusting a ratio of the aqueous portion to the organic portion to 1.0 to 20.0 by adding an aqueous solution to the aqueous stream; and
        separating the combined stream to form a purified aqueous stream, wherein less than or equal to 3 vol % of the purified aqueous stream is the organic portion.

2. The process of claim 1, wherein the organic portion of the aqueous stream has a viscosity of less than or equal to 30 centipoise.

3. The process of claim 2, wherein the organic portion of the aqueous stream has a viscosity of 20 to 30 centipoise.

4. The process of claim 1, comprising adjusting the ratio of the aqueous portion to the organic portion to 1.0 to 15.0 by adding the aqueous solution.

5. The process of claim 4, wherein the ratio of the aqueous portion to the organic portion is 1.0 to 10.0.

6. The process of claim 4, wherein the ratio of the aqueous portion to the organic portion is 1.0 to 6.0.

7. The process of claim 1, further comprising adjusting a pH of the aqueous portion 1.0 to 10.0 by adding an aqueous solvent.

8. The process of claim 7, wherein the pH is 1.0 to 6.0.

9. The process of claim 1, wherein less than or equal to 2 vol % of the purified aqueous stream is the organic portion.

10. The process of claim 9, wherein less than or equal to 1 vol % of the purified aqueous stream is the organic portion.

11. The process of claim 1, wherein one or both of the first organic solvent and the second organic solvent comprises methylene chloride, ethylene chloride, or a combination comprising one or both of the foregoing.

12. The process of claim 1, wherein the extracting the catalyst occurs prior to or during the extracting of the ions.

13. The process of claim 1, wherein the separating aqueous phase and the organic phase and the separating the combined stream occurs via a high shear rate centrifuge.

14. The process of claim 1, wherein the extracting of one or both of the catalyst and the ion occurs via one or more extraction columns.

15. The process of claim 1, wherein the polycarbonate comprises a bisphenol A homopolymer, a copolycarbonate comprising bisphenol A carbonate units and bulky bisphenol carbonate units derived from a bisphenol having at least 12 carbon atoms, or a polyestercarbonate comprising bisphenol A carbonate units and terephthalate-isophthalate acid-bisphenol A ester units.

16. The process of claim 15, wherein the polycarbonate comprises a copolymer comprising bisphenol A carbonate units and 2-phenyl-3,3'-bis(4-hydroxyphenyl) phthalimidine carbonate units, a copolymer comprising bisphenol A carbonate units and 1,1-bis(4-hydroxy-3-methylphenyl)cyclohexane carbonate units, or a copolymer comprising bisphenol A carbonate units and isophorone bisphenol carbonate units.

17. The process of claim 1, further comprising further purifying the purified polycarbonate stream.

18. The process of claim 1, comprising the adjusting the ratio of the aqueous portion to the organic portion to 1.0 to 20.0 by adding the aqueous solution to the aqueous stream.

* * * * *